(12) United States Patent
Lortz et al.

(10) Patent No.: US 7,645,335 B2
(45) Date of Patent: Jan. 12, 2010

(54) AQUEOUS DISPERSION OF HYDROPHOBIZED SILICON DIOXIDE POWDER COMPRISING A DISPERSING AGENT

(75) Inventors: Wolfgang Lortz, Wächtersbach (DE);
Christoph Batz-Sohn, Hanau (DE);
Gabriele Perlet, Großkrotzenburg (DE);
Werner Will, Gelnhausen (DE);
Kathrin Lehmann, Leverkusen (DE);
Angela Rüttgerodt, Köln (DE)

(73) Assignees: Degussa AG, Duesseldorf (DE);
Goldschmidt GmbH, Essen (DE)

( * ) Notice: Subject to any disclaimer, the term of this patent is extended or adjusted under 35 U.S.C. 154(b) by 510 days.

(21) Appl. No.: 10/546,061

(22) PCT Filed: Mar. 26, 2004

(86) PCT No.: PCT/EP2004/003209

§ 371 (c)(1),
(2), (4) Date: Aug. 18, 2005

(87) PCT Pub. No.: WO2004/089825

PCT Pub. Date: Oct. 21, 2004

(65) Prior Publication Data

US 2007/0145327 A1   Jun. 28, 2007

(30) Foreign Application Priority Data

Apr. 11, 2003 (DE) ................ 103 16 661

(51) Int. Cl.
*C04B 14/04* (2006.01)
*C08K 5/00* (2006.01)
*H01B 3/44* (2006.01)
*C04B 26/12* (2006.01)

(52) U.S. Cl. .............. 106/488; 106/499; 524/141; 524/188; 524/408

(58) Field of Classification Search ............... 106/410, 106/413, 506, 488, 499; 524/141, 188, 408, 524/505; 523/210, 220
See application file for complete search history.

(56) References Cited

U.S. PATENT DOCUMENTS

| | | | |
|---|---|---|---|
| 3,902,915 A | | 9/1975 | Crawford et al. |
| 4,194,986 A | * | 3/1980 | Tournier et al. ............ 510/316 |
| 4,507,426 A | * | 3/1985 | Blake, Jr. .................... 524/505 |
| 4,532,289 A | * | 7/1985 | Mosser et al. ............... 524/406 |
| 4,619,667 A | * | 10/1986 | Ueno et al. ..................... 8/444 |
| 5,261,927 A | * | 11/1993 | Walger et al. .................. 8/552 |
| 5,494,511 A | * | 2/1996 | Holbrook .................... 524/141 |
| 5,663,224 A | * | 9/1997 | Emmons et al. ............. 524/188 |
| 5,976,480 A | | 11/1999 | Mangold et al. |
| 6,063,182 A | * | 5/2000 | Babler ........................ 106/506 |
| 2002/0040662 A1 | | 4/2002 | Dietz et al. |

FOREIGN PATENT DOCUMENTS

| | | |
|---|---|---|
| EP | 0 844 016 | 5/1998 |
| EP | 0 979 844 | 2/2000 |
| WO | 02/094221 | 11/2002 |

\* cited by examiner

*Primary Examiner*—Jerry Lorengo
*Assistant Examiner*—Shuangyi Abu Ali
(74) *Attorney, Agent, or Firm*—Oblon, Spivak, McClelland, Maier & Neustadt, L.L.P.

(57) ABSTRACT

Aqueous dispersion which comprises hydrophobized silicon dioxide powder with a content of between 5 and 50 wt. % and which comprises at least one compound of the general formula $R\ \&\ \text{supl};\ —COO—(CH_2-CH(Ph))—O)a-(C_nH_{2n-x}R^2_x-O)b-R^3$ (I). It is prepared by dispersing the hydrophobic silicon dioxide powder, dispersing agent and optionally pH-regulating substances and further additives in an aqueous medium. It can be employed as an additive to waterborne fillers in the automobile industry, as a coating constituent in can and coil coating processes, as an additive in water-based UV-curable formulations e.g. for wood preservation and as a constituent of protective lacquer films.

19 Claims, No Drawings

AQUEOUS DISPERSION OF HYDROPHOBIZED SILICON DIOXIDE POWDER COMPRISING A DISPERSING AGENT

The invention provides an aqueous dispersion which comprises hydrophobized silicon dioxide powder and a dispersing auxiliary, and the preparation and use thereof.

Important points in the preparation of dispersions are:
a) good wetting of the fillers and pigments during incorporation. The dispersing times and the introduction of dispersing energy can be reduced as a result;
b) the lowest possible viscosity of the dispersions is often desirable;
c) after drying, a high degree of gloss should be achieved;
d) the tendency of the solid phase of the dispersion to settle should be minimal, including during long-term storage, transportation over long distances and under exposure to extreme climatic conditions;
e) no flocculation should occur in the dispersion. This is of particular importance in the preparation of reproducible colour shades using the colour mixing machines conventional nowadays;
f) the dispersion should be compatible with a large number of additives.

To fulfill these points, dispersing agents are as a rule added to the dispersion. A large number of water-soluble dispersing agents have already been proposed for this. For example, dispersing agents based on inexpensive, ionic structures, such as polyphosphates (Ullmann's Encyclopedia of Industrial Chemistry, Sixth Edition, Point 3.2.6., 2002; Th: Staffel, Farbe & Lack 100, 1994) and polyacrylic acids (WO-A-02/14415, WO-A-01/60925, J. Schroder, Farbe & Lack 91, 1985, 11; R. Hildred, Farbe & Lack, 1990, 857-859) or amphiphilic structures, that is to say with defined hydrophobic and hydrophilic blocks, based on nonionic fatty alcohol or alkylphenol ethoxylates or anionically modified derivatives thereof.

Nevertheless, low-viscosity, stable dispersions of hydrophobic, pyrogenically produced silicon dioxide powder which have a high filler content and show no pronounced structural viscosity or thixotropy have not yet been prepared successfully. Dispersions with a high filler content are desirable, because the transportation costs can be reduced as a result and because on incorporation into emulsion paints of high filler content these do not need to be diluted again with products of high water content.

The object of the invention is therefore to provide a dispersion with a high content of hydrophobized silicon dioxide powder, which shows no pronounced structural viscosity or thixotropy and has a high stability.

The object is achieved by an aqueous dispersion, which is characterized in that the content of hydrophobized silicon dioxide powder is between 5 and 50 wt. % and the dispersion comprises at least one compound of the general formula

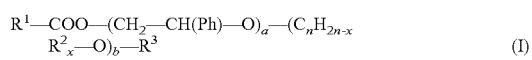

wherein
$R^1$ is hydrogen,
a linear or branched, saturated or unsaturated alkyl chain having 1 and up to 29 carbon atoms,
a phenyl radical, an alkyl-substituted phenyl radical having up to ten carbon atoms in the alkyl radical,
$R^2$ is an alkyl radical having 1 to 5 C atoms
$R^3$ is hydrogen,
an alkyl chain having 1 and up to 18 carbon atoms,
a benzyl radical,
an alkyl-substituted benzyl radical having up to four carbon atoms in the alkyl radical,
a $C(O)R^5$ group with a radical $R^5$ which contains an alkyl chain having 1 to 18 carbon atoms,
a $C(O)NHR^6$ group with a radical $R^6$ which contains a hydrogen atom or an alkyl chain having 1 to 18 carbon atoms,
—$C(O)OR^7$, which contains an alkyl chain $R^7$ having 1 to 18 carbon atoms,
Ph is a phenyl derivative with the general formula

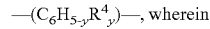, wherein $R^4$ is a hydroxyl radical, an alkyl radical having 1 to 6 carbon atoms or an alkoxy radical having 1 to 6 carbon atoms, and
y is a number from 0 to 5,
a is 0 to 5, b is 10 to 150, n is 2 to 4, x is 0 or 1.

Preferably, x can be 0. In the case where x is 1, $R^2$ is preferably —$CH_3$, $R^3$ is hydrogen, a is 0-2, b is 50-120, n is 2. For example, it is possible for
1. $R^1=C_{12}H_{25}$, Ph=$C_6H_5$, a=1, n=2, x=0, b=80, $R^3$=$CH_3$, or
2. $R^1=C_{18}H_{37}$, a=0, n=2, x=0, b=100, $R^3$=H, or
3. $R^1=C_{18}H_{37}$, a=0, n=2, x=1, $R^2$=$CH_3$, b=10, $R^3$=H, $R^1=C_{18}H_{37}$, a=0, n=2, x=0, b=90, $R^3$=H (as a mixture).

The content of compounds of the general formula I is not limited. It can preferably be between 0.5 and 50 wt. %, based on the dispersion, where the range between 2 and 10 wt. % can be particularly preferred.

The content of hydrophobized silicon dioxide powder in the aqueous dispersion according to the invention is between 5 and 50 wt. %, based on the dispersion, where the range between 10 and 30 wt. % is preferred.

More preferably, the hydrophobized silicon dioxide powder can be one which is obtained by hydrophobizing a pyrogenically prepared silicon dioxide powder. Pyrogenically is to be understood as meaning powders prepared by flame hydrolysis or flame oxidation. Pyrogenic silicon dioxide powder is described, for example, in Ullmann's Encyclopedia of Industrial Chemistry, vol. A23, page 635, 5th edition. These powder have on their surface reactive centres which can react with a hydrophobizing agent. Aerosil® R7200 (hydrophobizing agent 2-propenoic acid, 2-methyl-,3-(trimethoxysilyl)propyl ester, specific surface area approx. 150 m²/g), Aerosil® R8200 (silane-amine, 1,1,1-trimethyl-N-(trimethylsilyl)-, approx. 150 m²/g), Aerosil® R816 (silane, hexadecyltrimethoxy-, approx. 200 m²/g), Aerosil® R972 (silane, dichlorodimethyl-, approx. 100 m²/g), Aerosil® R974 (silane, dichlorodimethyl-, approx. 170 m²/g), Aerosil® R202 (silicones and siloxanes, dimethyl-, approx. 100 m²/g), Aerosil® R104 (octamethylcyclotetrasiloxane, approx. 150 m²/g), Aerosil® R106 (octamethylcyclotetrasiloxane, approx. 250 m²/g), Aerosil® R805 (octylsilane, approx. 150 m²/g), Aerosil® R812 and R812S (hexamethyldisilazane, approx. 260 m²/g) can be particularly suitable for the aqueous dispersion according to the invention. Aerosil® R972 can be very particularly preferred (all from Degussa AG).

The aqueous dispersion according to the invention can additionally comprise one or more defoamers. These can be defoamers based on mineral oils, or can be siloxane polyether derivatives or also organic polymers with hydrophobic solids as fillers. Those mentioned last can preferably originate from the field of polyoxyalkylenes. Organic polymers or a polyether-siloxane copolymer, each of which has silica as a filler, can be particularly preferred. Such silicas are explained in detail in Number 42 "Synthetische Kieselsäuren für Entschäumer" of the Pigmente publication series of Degussa AG. For example, SIPERNAT D 10, SIPERNAT D 17, ACE-MATT TS 100, AEROSIL 200 or AEROSIL R 972, all from Degussa AG, can be employed. The aqueous dispersion according to the invention can preferably comprise 0.1 to 3.0 wt. %, based on the dispersion, of defoamer. Particularly preferred defoamers are those described in DE-A-3807247, EP-A-777010 and U.S. Pat. No. 6,433,028.

The aqueous dispersion according to the invention can furthermore comprise at least one pH-regulating substance. As a rule, the viscosity of the aqueous dispersion according to the invention can also be modified through the pH. The pH-regulating substances can be acids, bases or buffer systems. Substances having a basic action, such as, for example, ammonia, ammonium hydroxide, alkali metal and alkaline earth metal hydroxides, amines and amino-alcohols are particularly preferred. Diethanolamine, butyldiethanolamine or triethanolamine, 2-amino-2-methyl-1-propanol or 2-amino-2-ethyl-1,3-propanediol can be particularly preferred.

The aqueous dispersion according to the invention can moreover also comprise alkylbenzenesulfonates, phosphorylated, sulfated or sulfonated polyoxyalkylenes, polyphosphates or polyacrylic acids. This can be advantageous if the aqueous dispersion according to the invention comprises anionically modified dispersing agents.

The aqueous dispersion according to the invention can comprise further dispersing agents. These can particularly preferably be styrene/maleic anhydride copolymers which contain amine oxide groups. Such copolymers are described in EP-A-1026178. This can increase the stability of the aqueous dispersion according to the invention.

The aqueous dispersion according to the invention can comprise at least one additive known to the expert from the group comprising biocides, anti-settling agents, neutralizing agents, thickeners, humectants, stabilizers, siccatives, light stabilizers and organic solvents.

The invention also provides a process for the preparation of the aqueous dispersion according to the invention, which is characterized in that the hydrophobic silicon dioxide powder, the dispersing agent of the general formula I and optionally pH-regulating substances and further additives are dispersed in an aqueous medium by means of a dispersing device.

The process for the preparation of the aqueous dispersion according to the invention can be carried out such that the dispersing agent is added in solid form or as an aqueous solution. It can preferably be added as an aqueous solution.

It can also be carried out by addition of the hydrophobic silicon dioxide powder, all at once or in portions, to an aqueous solution of the dispersing agent of the general formula I.

It is furthermore possible to introduce the hydrophobic silicon dioxide powder and the dispersing agent of the general formula I simultaneously, in portions or continuously, into the liquid dispersion phase.

Defoamers, pH-regulating compounds and further additives can be added before, during or after the dispersing, in bulk or in solution.

Any device which is capable of rendering possible intensive wetting of the hydrophobic powder with the aqueous phase is suitable as the dispersing device.

Dissolvers, the relatively simple construction of which renders possible a low-maintenance method of production with easy cleaning are popularly used for this in the coatings industry. Depending on the viscosity required or also the degree of filler content of the aqueous dispersion of hydrophobic pyrogenic silica to be produced, however, an intensive dispersing or after-grinding is still necessary. The after-grinding can be carried out, for example, in stirred bead mills. However, intensive shearing with the aid of rotor/stator machines is frequently sufficient. An appropriate combination of wetting and dispersing possibility is provided by the rotor/stator machines of Ystral, which allow the powder to be sucked in and, after closing of the powder suction opening, to be dispersed under intensive shear forces.

The process according to the invention can advantageously be carried out such that the aqueous dispersion is freed from air, both that adhering and that dispersed in. This can be effected by using a vacuum, for example by dispersing devices which can be evacuated, or with the DA/DA-VS vacuum deaerator from Netzsch Feinmahltechnik GmbH. The PSI-Mix system, an in-line mixing and dispersing system from Netzsch Feinmahltechnik GmbH, for example, can be employed for this. The hydrophobic silicon dioxide powder can furthermore already be deaerated before the dispersing. The addition of defoamers can be particularly advantageous.

It may be of advantage to carry out the process according to the invention such that the dispersion does not exceed a temperature of 50° C. This can be effected by cooling the mixing container by means of a heat exchanger.

The invention also provides the use of the aqueous dispersion according to the invention as an additive to waterborne fillers in the automobile industry, as a coating constituent in can and coil coating processes and as a constituent of protective lacquer films.

EXAMPLES

Determination of the viscosity of the dispersions: The viscosity of the dispersions produced was determined with a rotary rheometer from Physica model 300 and the measuring cup CC 27 at 25° C. The viscosity value was determined at a shear rate of $10\ s^{-1}$ and $100\ s^{-1}$. This shear rate is in a range in which the viscosity of the dispersions produced is practically independent of the shear stress.

Determination of the particle size present in the dispersion: The particle size present in the dispersion is determined by means of dynamic light scattering. The Zetasizer 3000 HSa apparatus (Malvern Instruments, UK) is used. The median value of the volume distribution $d_{50(v)}$ is stated.

Dispersing devices: The dispersing devices used were, for example, a dissolver of the Dispermat AE-3M type, VMA-GETZMANN, with a dissolver disk diameter of 80 mm and a rotor/stator dispersing unit of the Ultra-Turrax T 50 type from IKA-WERKE with the S50N-G45G dispersing tools. If the rotor-stator apparatus is used, the mixing tank is cooled to room temperature.

The 55 kg batch was produced with a rotor/stator machine of the Conti-TDS 3 type from Ystral. A 4 mm stator slot collar and 1 mm stator slot collar were employed. The final dispersing was carried out at 3,000 rpm.

Example 1

100 g Aerosil® R 972 are incorporated by means of a dissolver at a setting of approx. 2,500 rpm in portions into 192.5 g completely desalinated water, 88 g of a mixture of the dispersing agent $R^1$—COO—$(CH_2$—$CH(Ph)$—$O)_a$—$(C_nH_{2n-x}R^2{}_x$—$O)_b$—$R^3$ where $R=C_{18}H_{37}$, $a=0$, $n=2$, $x=0$, $b=100$, $R^3=H$ and the malic anhydride copolymer containing amine oxide from example 1, EP-A-1026178, as a dispersing additive, in a mixing ratio of 85:15, as a 40 percent solution in water and 7.5 g Tego Foamex 810, Degussa AG. The pH here is kept at 10 with a total of 1.79 g 90 percent 2-amino-2-methyl-1-propanol solution. After addition of the remaining 110.21 g of completely desalinated water, the mixture is homogenized further at 3,000 rpm for 15 minutes. The actual dispersing is then carried out with the aid of an Ultra Turrax at 7,000 rpm for 30 minutes. $d_{50(v)}$ is 193 nm, and the viscosity is 310 mPas at 10 s$^{-1}$ and 275 mPas at 100 s$^{-1}$. The dispersion shows no separation or sedimentation at all after 30 days.

Example 2

31.6 kg completely desalinated water, 10.0 kg of the dispersing agent R$^1$—COO—(CH$_2$—CH(Ph)—O)$_a$—(C$_n$H$_{2n-x}$R$^2_x$—O)$_b$—R$^3$ where R$^1$=C$_{18}$H$_{37}$, a=0, n=2, x=0, b=100, R$^3$=H as a 40 percent solution in water and 1.4 kg Tego Foamex 830, Degussa AG are initially introduced into a 60 l high-grade steel mixing tank. 11.0 kg AEROSIL® R 972 are then sucked in under shear conditions with the aid of the Conti-TDS 3 suction nozzle from Ystral (stator slot: 4 mm collar and 1 mm collar). During the dispersing-in of the AEROSIL® R 972, the pH is kept at pH 10 with 90 percent 2-amino-2-methyl-1-propanol solution. When the sucking in has ended, the suction connection is closed and the dispersion is subjected to further after-shear forces at 3,000 rpm for 10 min. The pH here is kept at 10 by further addition of 90 percent 2-amino-2-methyl-1-propanol solution. A total of 0.21 kg is used. The concentration is adjusted to 20% with a further 0.8 kg of completely desalinated water. During the dispersing operation the temperature is limited to a maximum of 40° C. by a heat exchanger.

$d_{50(v)}$ is 179 nm, and the viscosity is 285 mPas at 10 s$^{-1}$ and 240 mPas at 100 s$^{-1}$. The dispersion shows no separation or sedimentation at all after 30 days.

The invention claimed is:

1. An aqueous dispersion comprising hydrophobized silicon dioxide powder, wherein the content of hydrophobized silicon dioxide powder is between 5 and 50 wt. % and the dispersion comprises at least one compound of the general formula $$R^1\text{—COO—}(CH_2\text{—}CH(Ph)\text{—}O)_a\text{—}(C_nH_{2n-x}R^2_x\text{—}O)_b\text{—}R^3 \quad (I)$$

wherein
R$^1$ is hydrogen, a linear or branched, saturated or unsaturated alkyl chain having 1 and up to 29 carbon atoms, a phenyl radical, an alkyl-substituted phenyl radical having up to ten carbon atoms in the alkyl radical,
R$^2$ is an alkyl radical having 1 to 5 C atoms,
R$^3$ is hydrogen, an alkyl chain having 1 and up to 18 carbon atoms, a benzyl radical, an alkyl-substituted benzyl radical having up to four carbon atoms in the alkyl radical,
a C(O)R$^5$ group with a radical R$^5$ which contains an alkyl chain having 1 to 18 carbon atoms,
a C(O)NHR$^6$ group with a radical R$^6$ which contains a hydrogen atom or an alkyl chain having 1 to 18 carbon atoms,
—C(O)OR$^7$, which contains an alkyl chain R$^7$ having 1 to 18 carbon atoms,
Ph is a phenyl derivative with the general formula —(C$_6$H$_{5-y}$R$^4_y$)—, wherein R$^4$ is a hydroxyl radical, an alkyl radical having 1 to 6 carbon atoms or an alkoxy radical having 1 to 6 carbon atoms, and y is a number from 0 to 5, a is 0 to 5, b is 10 to 150, n is 2 to 4, x is 0 or 1, wherein the compound is present in an amount sufficient to inhibit separation of the dispersion for at least 30 days.

2. The aqueous dispersion according to claim 1, wherein the content of the compound of the general formula I is between 0.5 and 50 wt. %, based on the dispersion.

3. The aqueous dispersion according to claim 1, wherein the content of hydrophobized silicon dioxide powder is between 10 and 30 wt. %, based on the dispersion.

4. The aqueous dispersion according to claim 1, wherein the hydrophobized silicon dioxide powder is obtained by hydrophobization of a pyrogenically prepared silicon dioxide powder.

5. The aqueous dispersion according to claim 1, wherein the aqueous dispersion additionally comprises one or more defoamers.

6. The aqueous dispersion according to claim 1, wherein the aqueous dispersion comprises at least one pH-regulating substance.

7. The aqueous dispersion according to claim 1, wherein the aqueous dispersion comprises further dispersing agents.

8. The aqueous dispersion according to claim 1, wherein the aqueous dispersion comprises at least one additive selected from the group consisting of biocides, anti-settling agents, neutralizing agents, thickeners, humectants, stabilizers, siccatives, light stabilizers and organic solvents.

9. A process for the preparation of the aqueous dispersion according to claim 1, wherein the hydrophobic silicon dioxide powder, dispersing agent and optionally pH-regulating substances and further additives are dispersed in an aqueous medium.

10. The process according to claim 9, wherein the compounds of the general formula I are added in the form of an aqueous solution.

11. An additive comprising the aqueous dispersion according to claim 1.

12. A waterborne filler comprising the additive as claimed in claim 11 wherein the waterborne filler is utilized in the automobile industry.

13. A coating constituent comprising the aqueous dispersion as claimed in claim 1, wherein the coating constituent is utilized in a can or a coil coating process.

14. The additive as claimed in claim 11, wherein the additive is utilized in a water-based UV-curable formulation and/or a wood preservation formulation.

15. A protective lacquer film comprising the aqueous dispersion according to claim 1.

16. The aqueous dispersion according to claim 1, wherein b is 50 to 150.

17. The aqueous dispersion according to claim 1, wherein b is 50 to 120.

18. The aqueous dispersion according to claim 1, wherein the content of the compound of the general formula I is between 2 and 10 wt. %, based on the dispersion.

19. The aqueous dispersion according to claim 16, wherein the content of the compound of the general formula I is between 0.5 and 50 wt. %, based on the dispersion.

* * * * *